United States Patent [19]

De Bough

[11] 3,927,370
[45] Dec. 16, 1975

[54] AUDIO SIGNALLING SYSTEM HAVING PROBES FOR MONITORING THE CHARACTERISTICS OF A MATERIAL

[76] Inventor: Bjorn N. De Bough, 8011 First N.E., Seattle, Wash. 98115

[22] Filed: July 11, 1972

[21] Appl. No.: 270,706

[52] U.S. Cl................................ 324/65 R; 340/235
[51] Int. Cl.²......................................... G01R 27/02
[58] Field of Search......... 324/65 R, 65 P; 340/235, 340/244 C

[56] References Cited
UNITED STATES PATENTS

| | | | |
|---|---|---|---|
| 2,228,223 | 1/1941 | Bays........................... | 324/65 R X |
| 2,461,111 | 2/1949 | Flinspach et al............... | 324/65 R |
| 2,582,629 | 1/1952 | Hilton......................... | 324/65 P |
| 2,870,404 | 1/1959 | Oxley.......................... | 324/65 R |
| 3,221,317 | 11/1965 | Ferrigno, Jr.................. | 340/235 X |
| 3,412,325 | 11/1968 | Soderling...................... | 324/65 R |
| 3,689,832 | 9/1972 | Leto et al..................... | 324/65 R |

*Primary Examiner*—Stanley T. Krawczewicz

[57] ABSTRACT

System for monitoring the resistivity of a circuit path between sense electrodes in a volume of material and providing audio pulses of increasing frequency to cut-off where cut-off is indicative of a predetermined undesired quality of the volume of material. A unijunction transistor is utilized in a relaxation oscillator circuit and a predetermined value of resistance is connected in series path with a base electrode of the unijunction transistor to provide an alarm by oscillator cut-off when the current flow between probes becomes indicative that an undesired quality of the material has been reached, e.g., that saturation of soil by moisture is imminent or that drinking water has become polluted. A particular sense probe geometry provides accurate path measurements between the probes dependent upon the particular depth to which the probe tips have been inserted.

9 Claims, 5 Drawing Figures

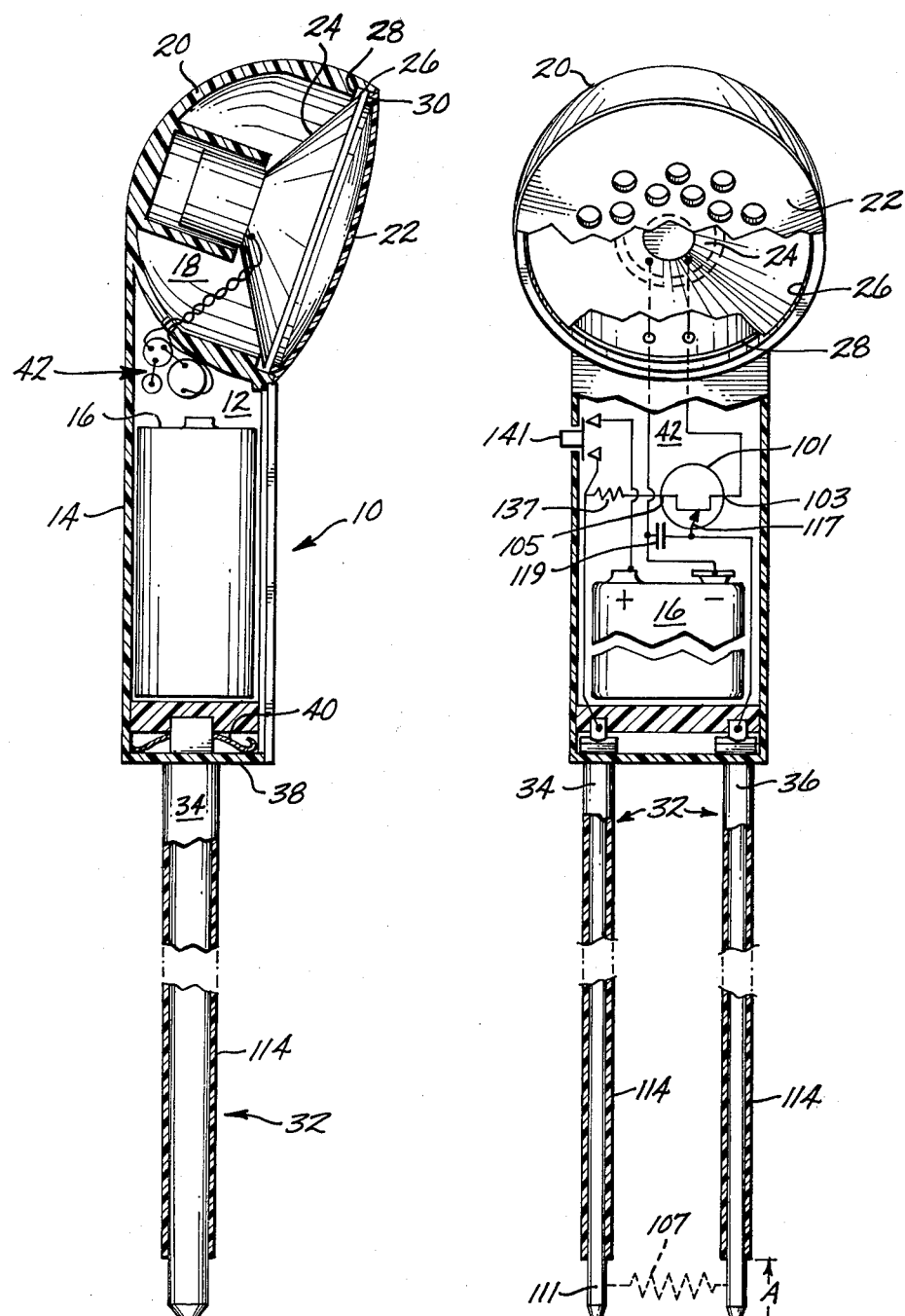

AUDIO SIGNALLING SYSTEM HAVING PROBES FOR MONITORING THE CHARACTERISTICS OF A MATERIAL

The invention relates to detection and alarm systems and more particularly to such systems utilizing relaxation oscillator circuits to provide signals representative of the particular information desired.

While the prior art has been extensively developed in the field of liquid level sensing per se to detect the absence of fluid at some critical level e.g., as exemplified by U.S. Pat. No. 3,646,541 and generally moisture sensing has been used in the control of automatic watering systems as exemplified in my U.S. Pat. No. 3,113,724, further studies in characteristics of impure soils e.g., containing decomposed leaves, trees, grass, cadavers of animals, etc. which are fertilized has led to the present data as portrayed in the graphs hereinafter described which resulted in the unique apparatus not requiring external adjustments for indicating when these widely different varieties of soils have become saturated with moisture. As a consequence water waste and consequent fertilizer and insecticide washdown through these soils to the groundwater and resultant pollution by unnecessary contamination of lakes, rivers, and drinking water can be avoided or reduced by accurate monitor of moisture level at root depth utilizing the present apparatus.

A further unique feature in probe design has resulted in the provision in the present apparatus of means for detecting moisture level and saturation thereof of soils of widely varying porosity characteristics at predetermined depths thereof e.g., at root levels.

These and other features, objects, and advantages of the present invention will become more fully apparent from the following description thereof by reference to the accompanying drawings wherein:

FIG. 1 is a side view taken in cross-section illustrative of the housing portion of the present apparatus, more particularly the manual sensing feature of the present invention;

FIG. 2 is a front view taken in cross section illustrative of the probe structure and circuit schematic of the present apparatus;

Figure 5:
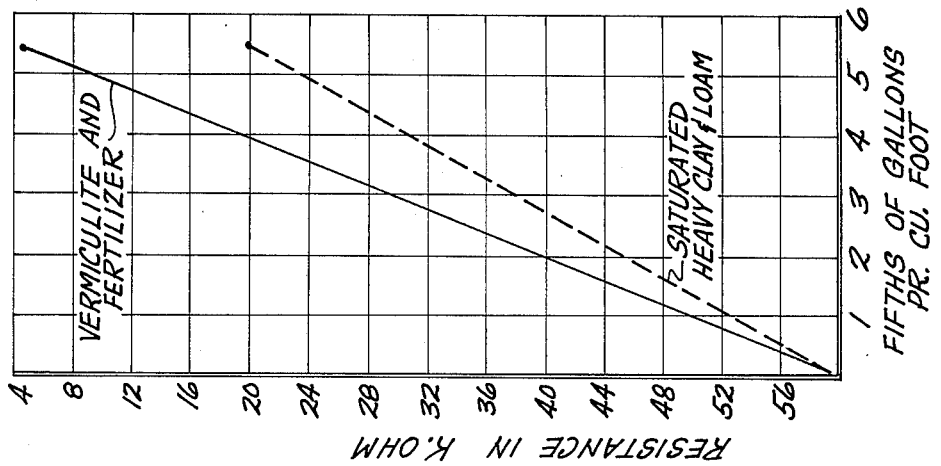

Turning now to FIG. 1 it will be observed that the present audio signalling system is enclosed in a housing indicated generally by the numeral 10 comprising a central body portion 12 surrounded by a wall member 14 for housing a source of potential comprising a battery 16 for powering the present audio signalling system. Terminating one end of the body portion 12 is a loudspeaker housing portion 18 having a generally spherical wall member 20 which is a contiguous extension of wall member 14. The front or open face portion of spherical wall member 20 is closed by a loudspeaker grill member 22 which comprises a sheet of perforated plastic, screen, or a grid of woven fabric through which audio signals from loudspeaker 24 are transmitted to the ear of the operator outside housing 10. It should be noted that loudspeaker housing portion 18 bears some resemblance to the earpiece portion of a telephone handset however a feature of the present apparatus deemed unique is the utilization of a novel mounting arrangement incorporated in the loudspeaker housing portion 18 which permits use of the loudspeaker as a transducer to impart vibrations to spherical wall member 20 so that the present audio signalling apparatus may be utilized also by those who are deaf or through old age have substantial hearing impediments or in fact persons more receptive to information by touch than by ear.

The present mounting means is arranged to permit movement of the loudspeaker support portion comprising the outer edge 26 of the circumference of loudspeaker 24 between opposing facing surfaces of the speaker housing portion 18 viz. between wall surface portion 28 of sherical wall member 20 and inner surface portion 30 of speaker grill member 22. The opposing facing mounting surfaces comprising recessed wall surface portion 28 and inner surface portion 30 are spaced apart a predetermined distance e.g., about one sixteenth inch to provide for speaker rattleing within and vibration of housing 10 with the larger amplitude vibration energy being induced in spherical wall member 20 hereinbefore mentioned as generally spherical in shape thereby providing two functions viz. for housing loudspeaker 24 and for providing hand holding in the palm of the hand of the operator thereby permitting easy insertion and withdrawl of the probes (indicated generally by the numeral 32) into the soil volume to be tested. In the side view of FIG. 1 showing one of the two probes 32, it can be seen that the housing 10 except for the above mentioned loudspeaker mounting configuration may be considered as a single ended telephone handset having a receiver portion 18, a handle portion 12, and replacing the mouthpiece portion in the conventional handset, a probe portion or end 32. The first probe 34 (left hand side probe when looking onto loudspeaker grill member 22) is seen to be retained in the baseportion 38 of body portion 12 by snap holding means comprising spring member 40. A similar snap holding arrangement is provided for second probe 36 (See FIG. 2) for easy assembly in the assembly process into the base portion 38 of plastic housing 10 comprising the previously mentioned wall members 14 and 20.

The circuit portion comprising the various circuit components of the system indicated generally at 42 may be housed in the body portion 12 of housing 10 (as shown in FIG. 1) or in speaker housing portion 18.

Turning now to FIG. 2 for a detailed description of the circuit and circuit functions and a description of the unique probe design which permits increased accuracy in measurement paths at various precise depths, it will be noted that circuit 42 comprises a relaxation oscillator type circuit which includes fixed value circuit components not requiring adjustment by the operator for use in different porosity soils. This unique design was permitted after study and appreciation of certain unique characteristics of fertilized soils of even greatly varying porosity e.g., from extremely porous viz. sandy (as shown in FIG. 3) through sandy loam (as shown in FIG. 4) to the non-porous saturated heavy clay and loam soil (as shown in FIG. 5).

Figure 4:
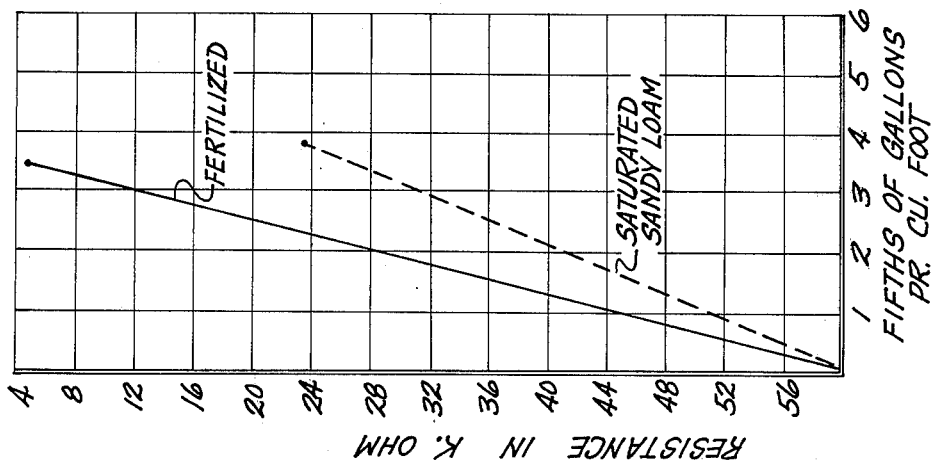
FIG. 4 is a graph illustrative of the resistivity characteristics of sandy loam soils with varying moisture content; and, FIG. 5 is a graph portraying the resistivity variation with moisture content of heavy clay and loam soils.
Figure 3:
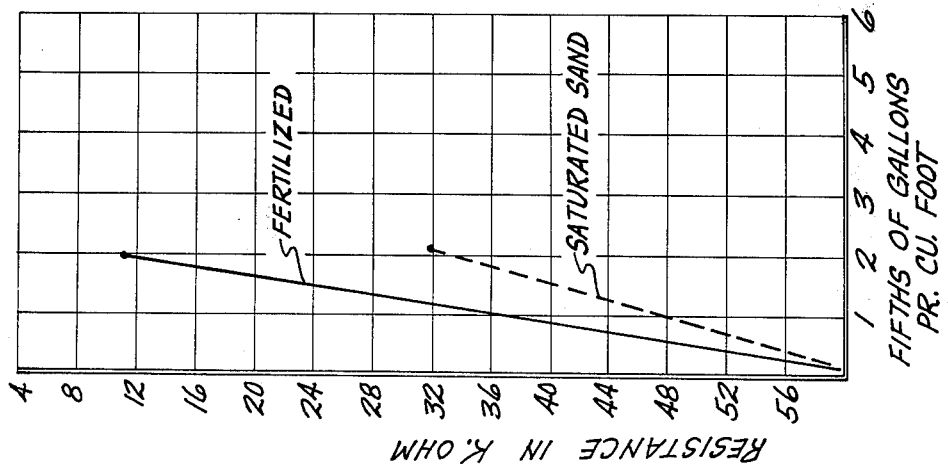
FIG. 3 is a graph illustrative of the resistivity characteristics of sandy soils with varying moisture content.

Turning now to page 2 of the drawings containing FIGS. 3, 4, and 5 it will be observed that sand since porous can hold very little water when it becomes saturated (as shown by the dotted line in FIG. 3) while at the other extreme heavy clay and loam mixture soil holds considerably more water per cubic foot when saturated. In this connection it should be noted from the dotted line representations in the graphs that the resistivity of saturated sand holding two fifths gallon of water per cubic foot is 32 kilohms (see FIG. 3) while at 32 kilohms resistivity the heavy clay and loam soil is holding four fifths gallon per cubic foot. Now turning to the solid line representations of these soils in the fertilized condition, it will be observed that at 12 kilohms resistivity, all soils from sand (See FIG. 3) through heavy clay and loam mixture (see FIG. 5) are all approaching and have nearly reached the 100% moisture level of resistivity shown at the top of the graphs where resistivity is equal to about 4 kilohms. It can now be recognized, that even with a wide variety of porosity soils in a fertilized condition viz. varying from sandy soil to saturated clay and loam soil, detection of soil resistivity at 12 kilohms will prevent application of water in excess of 100% (as indicated by a soil resistance level of 4 kilohms) so that excess moisture runoff including loss of insecticide and fertilizer can be prevented.

Turning now to the circuit 42 of FIG. 2 it will be seen how the audio pulse forming network of this circuit provides increase in pulse output frequency with increase in moisture level and cutoff of the audio output when a moisture level slightly less than 100% has been reached.

The circuit of FIG. 2 shown at 42 utilizes a unijunction transistor 101 in a relaxation type oscillator type circuit where discharge of the oscillator stored energy in capacitor 119 is through a lodspeaker 24 mounted as a transducer for mechanically driving by unique mechanical coupling means, a member 20 in the manner hereinbefore described. The frequency determining portion of the relaxation oscillator type circuit comprises the resistance 107 shown as a dotted line representing the particular type resistance path provided between probes 34 and 36 and hereinafter discussed.

Since as noted previously, the circuit 42 provides cut off of the audio output pulses to loudspeaker 24 when the resistance 107 drops to about 12 kilohms indicative of nearly 100% moisture content of the soil, that is just prior to reaching the 100% moisture level or saturation at a level of 4 kilohms, it now becomes extremely important to provide a probe configuration which will permit true path resistance measurement between two points in the soil at a predetermined depth e.g., as determined by the insertion depth of the probe tips 111 and 114.

It can be appreciated that unless the path between the probes is an accurate resistance measurement between the tips 111 and 114 thereof it would not be possible to accurately determine moisture saturations at the different levels of probe tip 114 and 111 insertion which is so important if the system is to have the capability of determining moisture saturation at root depth in the soil since root depths vary considerable depending upon age and type plant and saturation at other points e.g. at the surface is somewhat meaningless to plant growth.

To achieve a narrow path of current flow through the soil between probes 34 and 36, it is necessary that exposed tips 111 and 114 comprising the exposed uninsulated portions of metal conducting probes 34 and 36 should not have lengths greater than one half the distance between the probes, i.e., the exposed tip 111 and 114 lengths A should be equal to or less than one half the distance B between the probe tips 111 and 114. This critical configuration in probe design criteria permits a resistance value of resistance 107 meaningful in audio signal cutoff point in circuit 42. It should be noted that the metal conductive probes 34 and 36 are coated with electrically insulating material 114 (e.g., plastic) thus exposing only the probe tips 111 and 114 to the soil. In the probe design of the present system the distance A (probe tip length) was one half inch and in accordance with the previously mentioned criteria, the distance B between the probe tips was one inch. If the probes 34 and 36 were not coated with insulating material to provide the above ratio of probe exposure length A (as provided by the tips thereof 111 and 114) to probe spacing B (viz. one-half) then the resistance path would comprise a series of resistance in parallel along the entire lengths of the exposed probes and no meaningful information could be found at the important root depth since the tops of the probes at the surface could be wet giving a false indication of saturation while the roots at root depth might be dry.

Proceeding now to circuit 42, it will be noted that at the beginning of an operating cycle, the emitter 117 is reverse biased and therefore non-conducting. As the capacitor 119 is charged through the resistance 107 between probes 34 and 36 viz. between probe tips 111 and 114, the emitter 117 voltage rises exponentially towards the supply voltage provided by the battery potential source 16. When the emitter 117 voltage reaches the peak point voltage, the emitter 117 becomes forward biased and the capacitor 119 discharges through the series circuit path comprising base 103 and loudspeaker 24 to reference potential (−) of source of potential 16 thereby causing loudspeaker 24 to transmit an audible pulse ("click") also transmitting this pulse to the apparatus housing thereby vibrating it in the manner previously mentioned or by spacing the speaker 24 mount from the housing 10 a predetermined distance to permit speaker vibration or rattle within the housing 10 upon audio pulsing of loudspeaker 24. When capacitor 119 is discharged through loudspeaker 24 in the manner previously discussed, the emitter voltage reaches a minimum voltage and the emitter 117 ceases to conduct and the cycle is repeated. Further, base 105 of unijunction transistor 101 is coupled through resistor 137 and switching means 141 (shown in the off or open position) to the positive (+) source potential provided by battery 16. The resistor 137 has a predetermined and preselected value of 330 ohms so that as the pulse rate of the oscillator increases with drop in soil resistivity represented by resistor 107 to about 12 kilohms whereupon the resistance ratio of resistance 107 to resistance 137 becomes critical thereby causing the oscillator circuit 42 to cut off whereupon audio pulse output ceases thereby providing an alarm indication indicative of a nearly saturated (100%) moisture condition of the soil. If the selected value of resistance 137 were substantially less than 330 ohms there would be not cut off of the pulse output of the oscillator circuit to provide an alarm condition indicative of substantial moisture saturation point of the soil. If, on the other hand, resistance 137 had a value substantially exceeding 330 ohms, the point of substantially 100% moisture saturation of the soil would not be indicated by audio pulse cut out due to oscillator circuit cut off. In the circuit used successfully, a 9 volt battery 116 was utilized, unijunction transistor 101 comprised a type 2N2646, while capacitor 119 had a value of 10 microfarads and loudspeaker 24 had an impedance of 8 ohms.

A unique further use discovered for the above described apparatus was found while testing the water qualities of water in a fishbowl. It was found that after a period of time when the water had become stale or polluted by the fish and the water was no longer pure that the above oscillator circuit provided an alarm by audio cut out. It was further discovered that there was no audio pulse cutout but continued pulse output when certain other liquids could be safely consumed e.g., pulse output continued when the probe tips were inserted in the alcoholic beverage termed "manhattan." As a consequence it has been discovered that the present apparatus has certain other uses as an alarm indication when water has become polluted or certain liquids are unsafe or undesirable for human consumption.

I claim:

1. An audio signalling system comprising in combination:
    a loudspeaker;
    first and second probes;
    a relaxation oscillator circuit comprising:
    a unijunction transistor having an emitter and first and second base electrodes;
    a source of potential having positive and reference levels;
    a capacitor;
    a resistor coupled between said second base electrode and said first probe, said first probe further coupled to said positive reference level;
    said emitter coupled to said second probe, and said capacitor coupled between said emitter and said reference level;
    said loudspeaker coupled between said first base electrode and said reference level; and, wherein the resistance of said resistor and the resistance between said first and second probes provide cutoff of audio output pulses from said loudspeaker in said system when said resistance between said first and second probes is greater than about 4 kilohms.

2. The audio signalling system of claim 1 wherein said resistor has a resistance of about 330 ohms.

3. The audio signalling system of claim 1 wherein said first and second probes comprise insulated conductors and wherein the exposed tips of said probes have a length equal to or less than one half the distance between the tips of said probes.

4. The audio signalling system of claim 1 wherein the exposed tips of siad probes have a length of about one half inch.

5. A system for detecting the moisture content of soil at a predetermined depth comprising:
    first and second insulated probes having exposed electrically conductive tip portions for positioning at said predetermined depth for detecting the path resistance of said soil at said predetermined depth between said tip portions;
    an audio pulse signalling system coupled to said first and second probes for providing audio pulses at an increasing rate in response to decrease in resistivity of said soil and providing a zero audio pulse rate when said soil resistance between said probes is greater than about four kilohms.

6. The system of claim 5 wherein said audio pulse signalling system comprises a relaxation type oscillator circuit, and the exposed tip portions of said probes are less than or equal to about one half inch in length.

7. An audio signalling system for monitoring the characteristics of soil comprising in combination:
    a loudspeaker;
    an oscillator circuit coupled to said loudspeaker for providing audio output pulses;
    said oscillator circuit including a frequency determining portion comprising the circuit path provided between a pair of probes;
    said frequency determining portion of said oscillator circuit providing cut off of said audio output pulses when the resistance of said circuit path is greater than about 4 kilohms thereby providing an alarm indication indicative of a nearly saturated moisture condition of the soil.

8. An audio frequency signalling system for preventing application of water in excess of one hundred percent to fertilized soils of varying porosity comprising in combination:
    a pair of probes insulated along their exposed lengths to provide an exposure length to probe spacing ratio wherein true path resistance measurements are provided between said probes; and,
    an audio frequency oscillator circuit having a frequency determining network, said frequency determining network including the circuit path provided between said pair of probes, said frequency determining network providing audio frequency cut off of said oscillator circuit when the resistance of said circuit path is about 12 kilohms.

9. Apparatus for monitoring the characteristics of soil comprising in combination:
    a housing having a receiver portion including a loudspeaker, a probe portion including first and second probes mounted therein, and a central body portion intermediate said receiver portion and said probe portion;
    said first and second probes comprising insulated conductors having exposed tips less than or equal to about one half inch in length;
    an audio frequency oscillator circuit disposed in said housing and having a frequency determining network including the circuit path between said first and second probes, said audio frequency oscillator circuit coupled to said loudspeaker in said receiver portion of said housing and providing audio pulses at an increasing rate in response to decrease in resistivity of said soil and further providing a zero audio pulse rate when the soil resistance between said probes is less than about 4 kilohms.

* * * * *